United States Patent
Hiranaka et al.

(10) Patent No.: US 8,940,091 B2
(45) Date of Patent: Jan. 27, 2015

(54) SURFACTANT-COATED HEMIHYDRATE GYPSUM AND PRODUCTION METHOD THEREOF

(75) Inventors: Shingo Hiranaka, Shunan (JP); Hiroyoshi Kato, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 0 days.

(21) Appl. No.: 14/234,602

(22) PCT Filed: Aug. 21, 2012

(86) PCT No.: PCT/JP2012/071525
§ 371 (c)(1),
(2), (4) Date: Jan. 23, 2014

(87) PCT Pub. No.: WO2013/035563
PCT Pub. Date: Mar. 14, 2013

(65) Prior Publication Data
US 2014/0150693 A1    Jun. 5, 2014

(30) Foreign Application Priority Data

Sep. 8, 2011 (JP) ................................. 2011-196205

(51) Int. Cl.
  *C04B 20/10* (2006.01)
  *C04B 11/00* (2006.01)
  *C04B 28/14* (2006.01)
  *C04B 11/024* (2006.01)

(52) U.S. Cl.
  CPC ............. *C04B 11/005* (2013.01); *C04B 11/024* (2013.01); *C04B 20/1025* (2013.01); *C04B 20/1029* (2013.01); *C04B 20/1037* (2013.01)
  USPC ............................. 106/778; 428/404; 428/703

(58) Field of Classification Search
  CPC ............. C04B 11/005; C04B 2103/40; C04B 2103/406; C04B 20/1018; C04B 28/145

USPC .................................. 106/778; 428/404, 703
  See application file for complete search history.

(56) References Cited

U.S. PATENT DOCUMENTS

| 6,110,866 | A | * | 8/2000 | Walker ........................ 504/118 |
| 6,805,741 | B1 | | 10/2004 | Liu et al. |
| 7,504,165 | B2 | | 3/2009 | Lettkeman et al. |
| 8,083,850 | B2 | | 12/2011 | Kimijima et al. |
| 2004/0187741 | A1 | | 9/2004 | Liu et al. |
| 2006/0280970 | A1 | | 12/2006 | Lettkeman et al. |
| 2009/0256291 | A1 | | 10/2009 | Taira |

FOREIGN PATENT DOCUMENTS

| JP | 53-11928 A | 2/1978 |
| JP | 5-177124 A | 7/1993 |
| JP | 2006-521276 A | 9/2006 |
| JP | 2008-546618 A | 12/2008 |
| WO | WO 2008/001538 A1 | 1/2008 |

OTHER PUBLICATIONS

Translation of Japanese Patent Specification No. JP 49038695 (Oct. 1974).*
International Preliminary Report on Patentability for Appl. No. PCT/JP2012/071525 dated Mar. 12, 2014.
International Search Report, mailed Nov. 13, 2012, issued in PCT/JP2012/071525.

* cited by examiner

*Primary Examiner* — Anthony J Green
(74) *Attorney, Agent, or Firm* — Birch, Stewart, Kolasch & Birch, LLP

(57) ABSTRACT

Surfactant-coated hemihydrate gypsum which is coated with 0.01 to 1 part by weight of a surfactant based on 100 parts by weight of hemihydrate gypsum, wherein the residual rate of the surfactant when the surfactant-coated hemihydrate gypsum is heated up to 300° C. is not less than 40 wt % of the amount of the surfactant before heating.

7 Claims, 1 Drawing Sheet

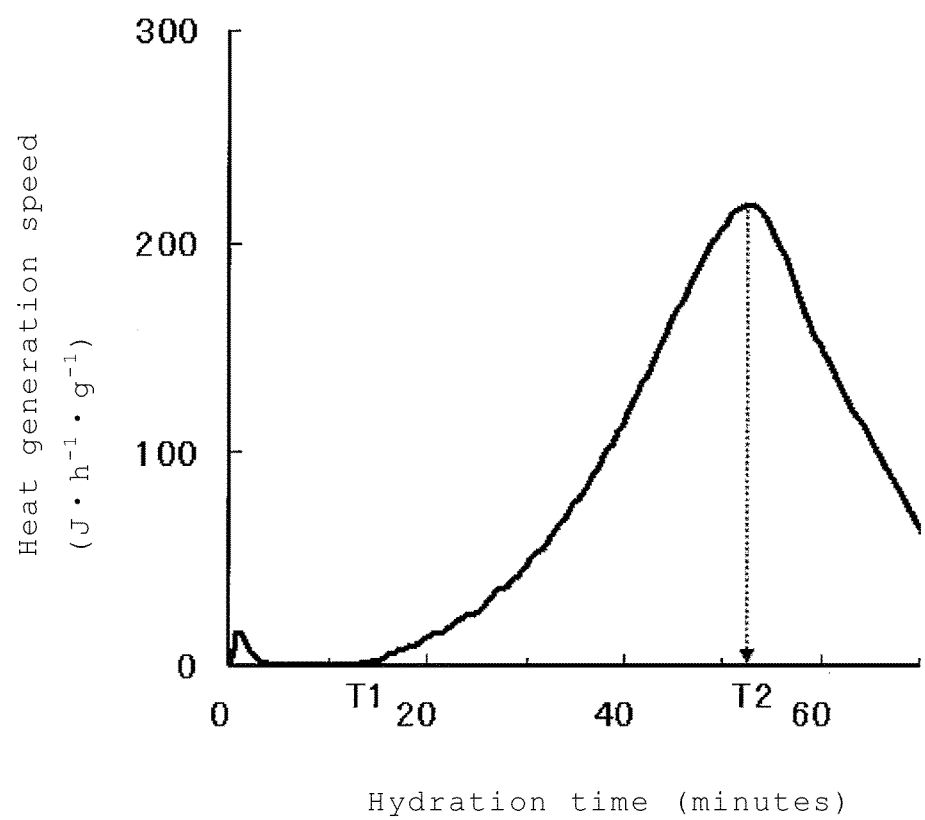

SURFACTANT-COATED HEMIHYDRATE GYPSUM AND PRODUCTION METHOD THEREOF

TECHNICAL FIELD

The present invention relates to surfactant-coated hemihydrate gypsum and a production method thereof. More specifically, it relates to surfactant-coated hemihydrate gypsum in which a surfactant is strongly adsorbed to the surface of hemihydrate gypsum to maximize an effect obtained by adding the surfactant and to a production method thereof.

BACKGROUND OF THE ART

When hemihydrate gypsum is mixed with water to prepare hemihydrate gypsum slurry, it is hydrated to become hardened easily as dihydrate gypsum. Therefore, it is widely used as a raw material for gypsum boards and medical casts.

When the hemihydrate gypsum is mixed with water, a hydration reaction begins accompanied by heat generation after the passage of a significant induction period so that the hemihydrate gypsum gradually becomes hardened. The length of the induction period and the length of time required until the end of the hydration reaction differ according to the particle diameter of the hemihydrate gypsum as a raw material, the mixing ratio of it and water, and the existence of an additive. For example, when the hemihydrate gypsum as a reagent and water are mixed together in a ratio (weight ratio) of 1:2 to carry out a hydration reaction in a laboratory, the induction period is about more than a dozen minutes and the hydration reaction ends in about 1 to 2 hours.

Since the hardening time becomes shorter as the hydration reaction rate is higher, thereby improving production efficiency, the hardening of the hemihydrate gypsum is generally carried out by adding a hydration reaction accelerator. As the above hydration reaction accelerator is used an alkali metal salt of sulfuric acid.

Both the induction period and the hardening time of the hemihydrate gypsum slurry comprising a hydration reaction acceleration are shortened. That is, when the hydration reaction accelerator is added to shorten the hardening time, the induction period is shortened together with the hardening time, whereby it is impossible in principle to achieve an induction time long enough for the work of casting into a form and a hardening time short enough from the viewpoint of work efficiency at the same time. Further, even when a very small amount of a known hydration reaction accelerator is added, its effect is not obtained. Only when a certain amount of the hydration reaction accelerator is added, its effect is abruptly developed. Therefore, it is actually extremely difficult to control the induction period to about 5 to 10 minutes by changing the amount of the hydration reaction accelerator.

To harden the hemihydrate gypsum, a certain amount of water must be added so as to secure the flowability of initial slurry. At this point, it is known that the content of water in the slurry and the time until the hardened product is completely dried correlate with each other. When the amount of water to be removed from the hardened product by evaporation differs by 5 wt %, the production cost greatly differs. Therefore, it is desired to reduce the content of water in the slurry as much as possible. However, when the content of water in the slurry is reduced, the flowability of the slurry is impaired. Therefore, there is limitation to the reduction of the content of water in the slurry.

Thus, there has been unknown hemihydrate gypsum having an induction time of several minutes which is preferred for the work of casting into a form and a short hardening time of several tens of minutes which is preferred for the improvement of work efficiency and exhibiting high flowability even when the content of water in the slurry is reduced.

SUMMARY OF THE INVENTION

The present invention was made in the view of the above situation. It is an object of the present invention to provide hemihydrate gypsum which achieves an induction time long enough for the work of casting into a form and a hardening time short enough from the viewpoint of work efficiency at the same time after it is mixed with water to prepare gypsum slurry.

It is another object of the present invention to provide hemihydrate gypsum which provides slurry having sufficiently high flowability even when the content of water in the slurry is reduced.

It is still another object of the present invention to provide a method of producing the above hemihydrate gypsum.

The inventors of the present invention conducted intensive studies to attain the above objects. As a result, they found that the effect of a surfactant is maximized when at least a certain percentage of the surfactant in use is strongly adsorbed to the surface of hemihydrate gypsum, thereby exerting a good influence upon the flowability and hardening behavior of gypsum slurry. Thus, the present invention was accomplished based on this finding.

That is, firstly, the above object of the present invention is attained by surfactant-coated hemihydrate gypsum which is coated with 0.01 to 1 part by weight of a surfactant based on 100 parts by weight of hemihydrate gypsum, wherein the residual rate of the surfactant when the surfactant-coated hemihydrate gypsum is heated up to 300° C. is not less than 40 wt % of the amount of the surfactant before heating.

Secondly, the above object of the present invention is attained by a method of producing the above surfactant-coated hemihydrate gypsum, comprising the step of heating a composition containing at least dihydrate gypsum and a surfactant at 110 to 200° C.

BRIEF DESCRIPTION OF THE DRAWING

FIG. 1 is a graph showing time changes in hydration heat generation speed measured in Comparative Example 1.

BEST MODE FOR CARRYING OUT THE INVENTION

<Surfactant-coated Hemihydrate Gypsum>

The surfactant-coated hemihydrate gypsum of the present invention is surfactant-coated hemihydrate gypsum which is coated with 0.01 to 1 part by weight of a surfactant based on 100 parts by weight of hemihydrate gypsum, wherein at least a certain percentage of the surfactant coated on the hemihydrate gypsum is strongly adsorbed to the surface of the hemihydrate gypsum.

As for the type of the surfactant in the surfactant-coated hemihydrate gypsum of the present invention, examples of the surfactant include sulfates of a polyoxyalkylene, alkali metal salts of a higher fatty acid, fatty acid esters of glycerin and polyoxyalkylene-based nonionic surfactants. At least one selected from these may be used.

Out of the above sulfates of a polyoxyalkylene, sulfates of polyoxyethylene are preferred, such as surfactants represented by the following formula (S1).

"

(In the above formula (S1), $R^1$ is an alkyl group having 12 to 18 carbon atoms, $M^{30}$ is an alkali metal ion or a tertiary ammonium ion, and in is an integer of 2 to 30.)

The above alkali metal ion is preferably a sodium ion, and the above tertiary ammonium ion is preferably $N^+H(CH_2CH_2OH)_3$. Examples of the surfactants represented by the above formula (S1) include sodium polyoxyethylene alkyl ether sulfates and triethanolamine polyoxyethylene alkyl ether sulfates. Examples of the alkyl group in these compounds include lauryl group, stearyl group and oleyl group. Commercially available products of the sulfates of a polyoxyalkylene include EMAL 20C, EMAL E-27C, EMAL 270J, EMAL 20CM, EMAL D-3-D, EMAL D-4-D, EMAL 20T, LATEMUL E-118B, LATEMUL E-150, LATEMUL WX and LEVENOL WX of Kao Corporation.

The number of carbon atoms of the higher fatty acid moiety out of the above alkali metal salts of a higher fatty acid is preferably 12 to 18 as the number of carbon atoms including the carbon atom of a carboxyl group. Sodium is preferred as the alkali metal. Examples of the alkali metal salts of a high fatty acid include sodium stearate and sodium oleate.

Monoesters are preferred as the above fatty acid esters of glycerin. The number of carbon atoms of the fatty acid moiety is preferably 12 to 18 as the number of carbon atoms including the carbon atom of a carboxyl group. Examples of the glycerin fatty acid esters include glycerin monostearic acid esters.

Out of the above polyoxyalkylene-based nonionic surfactants, polyoxyethylene-based nonionic surfactants are preferred, such as surfactants represented by the following formula (S2).

(In the above formula (S2), $R^2$ is an alkyl group having 12 to 18 carbon atoms or phenyl group, and n is an integer of 2 to 30.)

Examples of the surfactants include polyoxyethylene monolauryl ether, polyoxyethylene monocetyl ether, polyoxyethylene monostearyl ether, polyoxyethylene monooleyl ether, polyoxyethylene monomyristyl ether, polyoxyethylene octyldodecyl ether and polyoxyethylene nonylphenyl ether. Commercially available products of these polyoxyalkylene-based nonionic surfactants include EMULGEN 102KG, EMULGEN 103, EMULGEN 104P, EMULGEN 105, EMULGEN 106, EMULGEN 108, EMULGEN 109P, EMULGEN 120, EMULGEN 123P, EMULGEN 130K, EMULGEN 147, EMULGEN 150, EMULGEN 210P, EMULGEN 220, EMULGEN 306P, EMULGEN 320P, EMULGEN 350, EMULGEN 404, EMULGEN 408, EMULGEN 409PV, EMULGEN 420, EMULGEN 430, EMULGEN 705, EMULGEN 707, EMULGEN 709, EMULGEN 1108, EMULGEN 1118S-70, EMULGEN 1135S-70, EMULGEN 1150S-60, EMULGEN 4085, EMULGEN 2020G-HA and EMULGEN 2025G of Kao Corporation.

That at least a certain percentage of the above surfactant coated on the hemihydrate gypsum is strongly adsorbed to the surface of the hemihydrate gypsum means that the residual rate of the surfactant when the surfactant-coated hemihydrate gypsum is heated up to 300° C. is not less than 40 wt % of the amount of the surfactant before heating. This requirement can be checked by thermogravimetric analysis (TG/DTA).

When the temperature of the surfactant-coated hemihydrate gypsum is gradually raised, the desorption of the surfactant begins at about 250° C., a surfactant which has weak adsorption power first desorbs as the temperature rises, and the desorption almost ends at about 1,000° C. According to studies conducted by the inventors, it was found that a surfactant having weak desorption power which desorbs at a temperature of 250 to 300° C. and a surfactant having high adsorption power which desorbs at about 300° C. or higher differ from each other in the development quality or degree of the effect of the surfactant. That is, it was revealed that when a certain amount or more of a surfactant having strong adsorption power is coated in the surfactant-coated hemihydrate gypsum, the predetermined effect of the present invention is developed.

Then, the thermogravimetric analysis of the surfactant-coated hemihydrate gypsum is carried out to know the coating amount of the surfactant from a weight loss ratio R1 at 250 to 1,000° C. obtained from a TG chart, a weight loss ratio R2 at 250 to 300° C. in the above TG chart is obtained, and the values of R1 and R2 are inserted into the following mathematical expression (1) to obtain the residual rate of the surfactant when the surfactant-coated hemihydrate gypsum is heated up to 300° C.

$$\text{Residual rate (\%)} = \{(R1-R2) \div R1\} \times 100 \qquad (1)$$

The coating amount of the surfactant in the surfactant-coated hemihydrate gypsum is 0.01 to 1 part by weight, preferably 0.1 to 0.6 part by weight based on 100 parts by weight of hemihydrate gypsum (this does not include the surfactant).

The residual rate of the surfactant when the surfactant-coated hemihydrate gypsum is heated up to 300° C. is not less than 40 wt o, preferably 50 to 80 wt %.

The conditions of the thermogravimetric analysis for obtaining the values of R1 and R2 can be set as follows.
Temperature elevation rate: 20° C./min
Type of purge gas: air
Purge gas flow rate: 100 mL (STP)/min The surfactant-coated hemihydrate gypsum of the present invention preferably has a cumulative pore volume of not more than 0.5 mL/g. When the cumulative pore volume of the surfactant-coated hemihydrate gypsum falls within the above range, high flowability is obtained even when the content of water in the hemihydrate gypsum slurry is reduced, thereby making it possible to obtain both excellent physical properties and high work efficiency for a hardened product advantageously. The cumulative pore volume of the surfactant-coated hemihydrate gypsum is preferably small, more preferably not more than 0.45 mL/g, much more preferably not more than 0.4 mL/g. When this value is made extremely small, the production cost of hemihydrate gypsum as a raw material becomes huge. Even when the cumulative pore volume is made extremely small, balance between physical properties and work efficiency is not improved indefinitely. Therefore, the lower limit of the cumulative pore volume of the surfactant-coated hemihydrate gypsum should be about 0.3 mL/g.

The cumulative pore volume of the surfactant-coated hemihydrate gypsum can be measured by using a commercially available mercury intrusion type pore distribution measuring instrument.

<Method of Producing Surfactant-coated Hemihydrate Gypsum>

The above surfactant-coated hemihydrate gypsum of the present invention can be produced, for example, through the step of heating a composition containing at least dihydrate gypsum and a surfactant at 110 to 200° C.

As the dihydrate gypsum which can be used as a raw material for the surfactant-coated hemihydrate gypsum of the present invention, both natural gypsum and by-product gypsum (flue-gas desulfurized gypsum) may be used, and dihydrate gypsum recovered from waste gypsum boards may also be used.

However, in the method of producing surfactant-coated hemihydrate gypsum of the present invention, it is not preferred to directly use dihydrate gypsum obtained after it is recovered from waste gypsum boards and foreign matter such as board base paper is removed. That is, the cumulative pore volume of dihydrate gypsum recovered from the waste gypsum boards is large and almost maintained in the surfactant-coated hemihydrate gypsum. Therefore, when the recovered dihydrate gypsum is used directly as a raw material in the production method of the present invention, surfactant-coated hemihydrate gypsum which is inferior in the flowability of slurry is obtained. When the content of water in the slurry is increased to overcome the flowability problem, the time for removing water from the obtained hardened product by drying becomes too long disadvantageously.

Therefore, when dihydrate gypsum recovered from waste gypsum boards is used as a raw material for the surfactant-coated hemihydrate gypsum of the present invention, it is preferred to use dihydrate gypsum having the following preferred particle diameter and cumulative pore volume, which is prepared by baking the recovered dihydrate gypsum to obtain hemihydrate gypsum, dissolving it in water and subjecting the resulting product to a crystallization step to recrystallize it.

The average particle diameter (D50) of the dihydrate gypsum used as a raw material for the surfactant-coated hemihydrate gypsum of the present invention is preferably 10 to 100 μm, more preferably 20 to 60 μm. The cumulative pore volume of the dihydrate gypsum used as a raw material for the surfactant-coated hemihydrate gypsum of the present invention is preferably not more than 0.5 mL/g, more preferably 0.1 to 0.4 mL/g, much more preferably 0.2 to 0.3 mL/g.

The composition containing at least the above dihydrate gypsum and a surfactant may be a dry composition which is substantially composed of powdery dihydrate gypsum and a surfactant, or a cake containing dihydrate gypsum, a surfactant and a suitable liquid medium.

The former dry composition can be produced by spraying the surfactant upon the powdery dihydrate gypsum.

In this dry composition, all the sprayed surfactant remains in the composition. Therefore, the amount of the surfactant to be sprayed can be set to a value calculated from a desired percentage of the surfactant in the obtained surfactant-coated hemihydrate gypsum in consideration of the weight of crystal water reduced by thermal dehydration.

The surfactant is preferably sprayed while the dihydrate gypsum is stirred. Spraying under agitation maybe carried out by using a known appropriate kneader for the surface treatment of the powder. The temperature of the dihydrate gypsum when the surfactant is sprayed is preferably 10 to 80° C., more preferably 20 to 60° C. After the end of spraying, stirring is desirably continued for preferably 1 to 30 minutes, more preferably 5 to 10 minutes.

Meanwhile, the latter cake composition containing dihydrate gypsum, a surfactant and a liquid medium can be produced by separating an excess liquid medium from the slurry containing dihydrate gypsum, a surfactant and the excess liquid medium.

Examples of the liquid medium used herein include water and organic solvents, at least one out of which may be used. The organic solvents are preferably water-soluble organic solvents such as methanol, ethanol and acetone. A suitable one is preferably selected from water and the organic solvents according to the HLB value of the surfactant in use. It is easy for a person having ordinary skill in the art to select a liquid medium suitable for use with the surfactant. The content of the dihydrate gypsum in the slurry is preferably 5 to 50 wt %, more preferably 20 to 40 wt %.

Not all the used surfactant remains in the cake composition but part of the surfactant is discharged by filtration while it is dissolved in the liquid medium. Therefore, in the case of the cake, if the surfactant is used only in an amount calculated from the content of the surfactant in the obtained surfactant-coated hemihydrate gypsum in consideration of the weight of crystal water reduced by thermal dehydration, surfactant-coated hemihydrate gypsum having a lower content of the surfactant than the desired value is obtained. In consideration of this, the amount of the surfactant in the case of the cake is preferably 0.1 to 10 parts by weight, more preferably 1 to 5 parts by weight based on 100 parts by weight of the dihydrate gypsum.

The slurry for obtaining the cake is preferably prepared under agitation. The temperature for preparing the slurry is preferably 10 to 60° C., more preferably 20 to 40° C., and the agitation time is preferably 1 minute or longer, more preferably 3 to 30 minutes, much more preferably 5 to 10 minutes.

The cake can be obtained by separating the excess liquid medium from the obtained slurry. To separate the excess liquid medium from the slurry, a filtering apparatus such as a rotary screen, a drum filter, a disk filter, a Nuche filter, a filter press, a screw press or a tube press; or a centrifugal machine such as a screw decanter or a screen decanter may be used.

The cake to be supplied to the subsequent heating step as the composition in the method of the present invention preferably has a solids content of not less than 80 wt %.

Then, the surfactant-coated hemihydrate gypsum of the present invention can be obtained preferably by subjecting the dry or cake composition to the step of heating at 110 to 200° C. The heating temperature is preferably 120 to 160° C. The heating time is preferably 10 to 120 minutes, more preferably 20 to 60 minutes.

Thus, the surfactant-coated hemihydrate gypsum of the present invention can be obtained.

<Feature of Surfactant-coated Hemihydrate Gypsum>

The surfactant-coated hemihydrate gypsum of the present invention obtained as described above has such a long induction period that the work of casting into a form can be carried out in good time after it is mixed with water to prepare gypsum slurry as well as extremely high work efficiency as it hardens swiftly after the end of the induction period. Further, since the surfactant-coated hemihydrate gypsum of the present invention has excellent flowability, it can reduce the amount of water used to prepare gypsum slurry, thereby making it possible to obtain a hardened product having improved strength.

The gypsum slurry obtained by mixing the surfactant-coated hemihydrate gypsum of the present invention with a preferred amount of water which will be described hereinafter has an induction time T1 before the start of a hydration reaction of 5 to 15 minutes, possibly 5 to 10 minutes. The time T2 when the hydration heat generation speed becomes maximum as an index for the acceleration of a hydration reaction can be set to 15 to 45 minutes, possibly 20 to 40 minutes.

Hemihydrate gypsum having such a long induction time and such a short hydration time has been unknown until now.

EXAMPLES

The guaranteed reagent of Wako Pure Chemical Industries, Ltd. was used as dihydrate gypsum in the following examples and comparative examples.

The evaluation methods of gypsums obtained in examples and comparative examples are as follows.

(1) Coating Amount of Surfactant in Surfactant-Coated Hemihydrate Gypsum

The coating amount of the surfactant in the surfactant-coated hemihydrate gypsum produced was calculated by carrying out thermogravimetric analysis (TG) under the following conditions and using a weight loss ratio R1 at 250 to 1,000° C. obtained from the obtained TG chart.

Used apparatus: TG/DTA6300 of Seiko Instruments Inc.
Temperature elevation rate: 20° C./min
Type of purge gas: air
Purge gas flow rate: 100 mL(STP)/min (2) Residual Rate of Surfactant when Heated up to 300° C.

The weight loss ratio R2 at 250 to 300° C. was obtained from the TG chart obtained in (1) above, and this value and the weight loss ratio R1 at 250 to 1,000° C. obtained in (1) above were inserted into the above mathematical expression (1) to calculate this.

(3) Cumulative Pore Volume

The cumulative pore volume of gypsum was measured by using the AutoPore IV series mercury intrusion type pore distribution measuring instrument of Micromeritics Instrument Corporation.

(4) Hydration Heat Generation Speed

The hydration heat generation speed of a specimen prepared by mixing 1 g of each of the hemihydrate gypsums coated or not coated with a surfactant obtained in Examples and Comparative Examples with 2 mL of water or an aqueous solution was measured by using the twin type conductive microcalorimeter of Tokyo Riko Co., Ltd.

As a measurement example, a heat generation speed-time curve measured in Comparative Example 1 which will be described hereinafter is shown in FIG. 1. It can be judged that as the hydration heat generation speed becomes faster, the hydration reaction proceeds more briskly. The time until a heat generation reaction speed rises is represented by T1 and used as an index for the induction period. The time until the hydration heat generation speed becomes maximum is represented by T2 and used as an index for the acceleration of hydration.

Comparative Example 1 (example of hemihydrate gypsum not coated with a surfactant)

Hemihydrate gypsum was obtained by heating dihydrate gypsum in a drier set at 120° C. for 2 hours. T1 of the obtained hemihydrate gypsum was 12 minutes and T2 thereof was 52 minutes.

Comparative Example 2 (example of prior art in which sodium sulfate was added as a hydration reaction accelerator)

Hemihydrate gypsum was obtained by heating dihydrate gypsum in a drier set at 120° C. for 2 hours. T1 of a product obtained by mixing together 1 g of this hemihydrate gypsum and 2 ml of a sodium sulfate aqueous solution having a concentration of 0.1 mol/L was 1 minute and T2 thereof was 16 minutes.

Example 1 (example of the method of the present invention)

50 g of dihydrate gypsum was injected into an aqueous solution prepared by dissolving 1 mL of polyoxyethylene lauryl ether (EMULGEN 108 of Kao Corporation (about 100 wt % of an effective component)) as a surfactant in 100 mL of water and stirred for 10 minutes, and the resulting solution was vacuum filtered with No. 5A filter of ADVANTEC to obtain a dihydrate gypsum cake. This dihydrate gypsum cake was heated in a drier set at 120° C. for 2 hours to obtain surfactant-coated hemihydrate gypsum.

The coating amount of the surfactant in the surfactant-coated hemihydrate gypsum was 0.25 wt %, and the residual rate of the surfactant when heated up to 300° C. was 80 wt %. When the hydration heat generation speed of this surfactant-coated hemihydrate gypsum was measured, T1 was 8 minutes and T2 was 27 minutes.

Example 2 (example of the method of the present invention)

The operation of Example 1 was repeated except that the amount of polyoxyethylene lauryl ether (EMULGEN 108 of Kao Corporation) about 100 wt % of an effective component)) was changed to 5 mL in Example 1 to obtain surfactant-coated hemihydrate gypsum.

The coating amount of the surfactant in the surfactant-coated hemihydrate gypsum, the residual rate of the surfactant, T1 and T2 are shown in Table 1.

Example 3 (example of the method of the present invention)

The operation of Example 1 was repeated except that 20 mL of sodium polyoxyethylene lauryl ether sulfate (EMAL 20C of Kao Corporation) about 25 wt % of an effective component)) was used in place of polyoxyethylene lauryl ether to obtain surfactant-coated hemihydrate gypsum.

The coating amount of the surfactant in the surfactant-coated hemihydrate gypsum, the residual rate of the surfactant, T1 and 12 are shown in Table 1.

Example 4 (example of the method of the present invention)

50 g of dihydrate gypsum was injected into a solution prepared by dissolving 5 mL of polyoxyethylene(2)oleyl ether (of Wako Pure Chemical Industries, Ltd.) as a surfactant in 100 mL of ethanol and stirred for 10 minutes, and the resulting solution was vacuum filtered with No. 5A filter of ADVANTEC to obtain a dihydrate gypsum cake. This dihydrate gypsum cake was heated in a drier set at 120° C. for 2 hours to obtain surfactant-coated hemihydrate gypsum.

The coating amount of the surfactant in the surfactant-coated hemihydrate gypsum, the residual rate of the surfactant, T1 and T2 are shown in Table 1.

Comparative Example 3 (example 1 in which hemihydrate gypsum and a surfactant were brought into contact with each other)

40 g of hemihydrate gypsum obtained in Comparative Example 1 was injected into a solution prepared by dissolving 5 mL of polyoxyethylene lauryl ether (EMULGEN 108 of Kao Corporation) as a surfactant in 100 mL of ethanol and stirred for 10 minutes, and the resulting solution was vacuum filtered with No. 5A filter of ADVANTEC to obtain a hemihydrate gypsum cake. The obtained hemihydrate gypsum cake was left at room temperature (25° C.) and normal pressure for 24 hours to remove ethanol, thereby obtaining surfactant-coated hemihydrate gypsum.

The coating amount of the surfactant in the surfactant-coated hemihydrate gypsum, the residual rate of the surfactant, T1 and T2 are shown in Table 1.

Comparative Example 4 (example 2 in which hemihydrate gypsum and a surfactant were brought into contact with each other)

40 g of hemihydrate gypsum obtained in Comparative Example 1 was injected into a solution prepared by dissolving 5 mL of polyoxyethylene lauryl ether (EMULGEN 108 of Kao Corporation) as a surfactant in 100 mL of ethanol and stirred for 10 minutes, and the resulting solution was vacuum filtered with No. 5A filter of ADVANTEC to obtain a hemihydrate gypsum cake. The obtained hemihydrate gypsum cake was left at room temperature (25° C.) and normal pressure for 24 hours to remove ethanol and heated in a drier set at 120° C. for 2 hours to obtain surfactant-coated hemihydrate gypsum.

The coating amount of the surfactant in the surfactant-coated hemihydrate gypsum, the residual rate of the surfactant, T1 and T2 are shown in Table 1.

TABLE 1

| | Surfactant | | Cumulative | Hydration heat generation speed | |
|---|---|---|---|---|---|
| | Coating amount (wt %) | Residual rate up to 300° C. (%) | pore volume (mL/g) | T1 (min) | T2 (min) |
| C. Ex. 1 | 0 | — | 0.4 | 12 | 52 |
| C. Ex. 2 | 0 | — | 0.4 | 1 | 16 |
| Ex. 1 | 0.25 | 80 | 0.4 | 8 | 27 |
| Ex. 2 | 0.52 | 86 | 0.4 | 7 | 22 |
| Ex. 3 | 0.48 | 81 | 0.4 | 8 | 26 |
| Ex. 4 | 0.57 | 85 | 0.4 | 6 | 24 |
| C. Ex. 3 | 0.56 | 21 | 0.4 | 13 | 53 |
| C. Ex. 4 | 0.45 | 17 | 0.4 | 13 | 52 |

Ex.: Example C. Ex.: Comparative Example

In the following examples and comparative examples, the flowability of hemihydrate gypsum slurry prepared by mixing hemihydrate gypsum with water was checked.

The flowability of the hemihydrate gypsum slurry was evaluated as the amount of water required to achieve a flow value measured by the following method of 140 mm (amount of water mixed, amount (mL) of water based on 100 g of hemihydrate gypsum).

When the flow value of the hemihydrate gypsum slurry is 140 mm, the hemihydrate gypsum slurry has high flowability that it can be easily cast into a form measuring 40×40×160 mm. Therefore, this flow value is used as a standard.

(5) Method of Measuring a Flow Value

Slurry prepared by adding water (a 0.1 mol/L sodium sulfate aqueous solution in Comparative Example 6) to 100 g of hemihydrate gypsum coated or not coated with a surfactant and mixing and stirring them together for 15 seconds was charged into a vinyl chloride pipe having an inner diameter of 50 mm and a height of 51 mm (inner capacity of 100 mL) placed on sheet glass. Right after that, the above vinyl chloride pipe was pulled up, the charged slurry spread over the sheet glass and stayed still, and then the diameters in two crossing directions of the slurry were measured to obtain the average value as a flow value.

Example 5

The amount of water required to achieve a flow value of the surfactant-coated hemihydrate gypsum obtained in the above Example 2 of 140 mm was measured. The result is shown in Table 2 as the amount of water mixed.

Comparative Example 5

The amount of water required to achieve a flow value of the hemihydrate gypsum obtained in the above Comparative Example 1 of 140 mm was measured. The result is shown in Table 2 as the amount of water mixed.

Comparative Example 6

The amount of a 0.1 mol/L sodium sulfate aqueous solution required in place of water to achieve a flow value of the hydration reaction accelerator-coated hemihydrate gypsum obtained in the above Comparative Example 1 of 140 mm was measured. The result is shown in Table 2 as the amount of water mixed.

When the hemihydrate gypsum slurry hardens, the hemihydrate gypsum contained in the slurry becomes dihydrate gypsum. The amount of water introduced into the hardened product as crystal water is calculated as 18.6 mL based on 100 g of the hemihydrate gypsum. Therefore, the amount of water to be removed by evaporation from the hardened product obtained from the slurry having a flow value of 140 mm is a value obtained by subtracting 18.6 mL from the amount of water mixed shown in Table 2 below. This value is also shown in Table 2.

TABLE 2

| | Type of hemihydrate gypsum | Amount of water mixed (mL) | Amount of water to be removed by evaporation (mL) |
|---|---|---|---|
| Ex. 5 | Coated with surfactant | 94 | 75.4 |
| C. Ex. 5 | Not coated | 100 | 81.4 |
| C. Ex. 6 | Coated with hydration reaction accelerator | 105 | 86.4 |

Ex.: Example C. Ex.: Comparative Example

Since the hemihydrate gypsum actually used in the prior art is hemihydrate gypsum coated with a hydration reaction accelerator like the above Comparative Example 6 (comparative Example 1), the effect of reducing the amount of water in the present invention (Example 5) is calculated based on this as follows.

The amount of water to be removed from the hardened product of Comparative Example 6 by evaporation is 86.4 g whereas the amount of water to be removed from the hardened product of Example 5 by evaporation is merely 75.4 g. The reduction (%) can be calculated as $\{1-(75.4 \div 86.4)\} \times 100 = 12.7$ wt %.

As having been stated in the description of the prior art, when the amount of water to be removed from the hardened product by evaporation differs by 5 wt %, the production cost greatly differs. Therefore, the technology of the present invention which makes it possible to reduce the amount of water in use by 12 wt % or more makes it possible to greatly cut the production cost.

Effect of the Invention

After the surfactant-coated hemihydrate gypsum of the present invention is mixed with water to prepare gypsum slurry, both a long induction period and a short hardening time are obtained. Therefore, since the work of casting into a form can be carried out in good time and the gypsum slurry quickly hardens after the end of the casting work, the efficiency of hardening work becomes extremely high.

Since the surfactant-coated hemihydrate gypsum of the present invention has sufficiently high flowability even when it is mixed with a smaller amount of water than usual to prepare gypsum slurry, a hardened product can be formed efficiently in a short period of time.

Further, according to the method of producing the surfactant-coated hemihydrate gypsum of the present invention, the surfactant-coated hemihydrate gypsum of the present invention having the above advantageous feature can be easily produced.

The invention claimed is:

1. A method of producing a surfactant-coated hemihydrate gypsum, which comprises the step of heating a composition containing at least dihydrate gypsum and a surfactant at 110 to 200° C. to form the surfactant-coated hemihydrate gypsum which is coated with 0.01 to 1 part by weight of surfactant based on 100 parts by weight of hemihydrate gypsum, wherein
   the residual rate of the surfactant when the surfactant-coated hemihydrate gypsum is heated up to 300° C. is not less than 40 wt % of the amount of the surfactant before heating.

2. The method according to claim 1, wherein the coating amount of the surfactant on the surfactant-coated hemihydrate gypsum is 0.1 to 0.6 part by weight based on 100 parts by weight of hemihydrate gypsum.

3. The method according to claim 1, wherein the surfactant is at least one selected from the group consisting of sulfates of a polyoxyalkylene, alkali metal salts of a higher fatty acid, fatty acid esters of glycerin and polyoxyalkylene-based nonionic surfactants.

4. The method according to claim 1, wherein the surfactant-coated hemihydrate gypsum has a cumulative pore volume of not more than 0.5 mL/g.

5. The method according to claim 1, wherein the dihydrate gypsum is at least one selected from the group consisting of natural gypsum, flue-gas desulfurized gypsum and recovered dihydrate gypsum which has undergone a crystallization step.

6. The method according to claim 2, wherein the surfactant is at least one selected from the group consisting of sulfates of a polyoxyalkylene, alkali metal salts of a higher fatty acid, fatty acid esters of glycerin and polyoxyalkylene-based nonionic surfactants.

7. The method according to claim 2, wherein the surfactant-coated hemihydrate gypsum has a cumulative pore volume of not more than 0.5 mL/g.

* * * * *